UNITED STATES PATENT OFFICE.

SAMUEL OLIVER, OF NORTHAMPTON COUNTY, PENNSYLVANIA.

IMPROVEMENT IN THE ART OF DISTILLING.

Specification forming part of Letters Patent No. 2,207, dated August 4, 1841.

*To all whom it may concern:*

Be it known that I, SAMUEL OLIVER, of the county of Northampton and Commonwealth of Pennsylvania, have invented, discovered, and applied to use a new and improved application of wood-ashes, lye, or potash in the distillation of whisky and alcohol from rye, corn, and other grain; and I do hereby declare that the following is a full and exact description.

The nature of my invention and discovery consists in the introduction of wood-ashes, lye, or potash, or either of them, into combination with the rye, corn, or other grain after it has been mashed and before the process of fermentation commences, and mixing it with the same in the proportions specified hereinafter.

To enable others skilled in the art to make use of my discovery and improvement, I will proceed to describe the manner in which it is to be used, the time of its introduction into combination with the mashed grain, and the proportions in which it is to be used.

After mashing the grain for distillation and before the process of fermentation commences, I introduce into combination with the mashed grain one pint and a half, or thereabout of wood-ashes to each bushel of mashed grain, one quart, or thereabout, of lye to each bushel of mashed grain, or one-third of an ounce, or thereabout, of potash to each bushel of mashed grain. I then by means of stirring mix them well together. The ashes, lye, or potash are introduced into the fermenting-tun before the process of fermentation is commenced, and are mixed with the grain before the mash is put with it.

What I claim as my invention, discovery, and improvement, and desire to secure by Letters Patent, is—

The application of wood-ashes, lye, or potash to the process of distillation of rye, corn, or other grain into whisky or alcohol, for the purpose of retarding the acetous fermentation and increasing the yield, using the above-specified quantities or increasing or diminishing them as circumstances may require.

July 23, 1841.

SAMUEL OLIVER.

Witnesses:
  A. E. BROWN,
  J. WEYGANDT.